Dec. 16, 1952 M. BRACUTT 2,622,239
DIRECT CURRENT CONTROL SYSTEM
Filed March 18, 1950 4 Sheets-Sheet 1
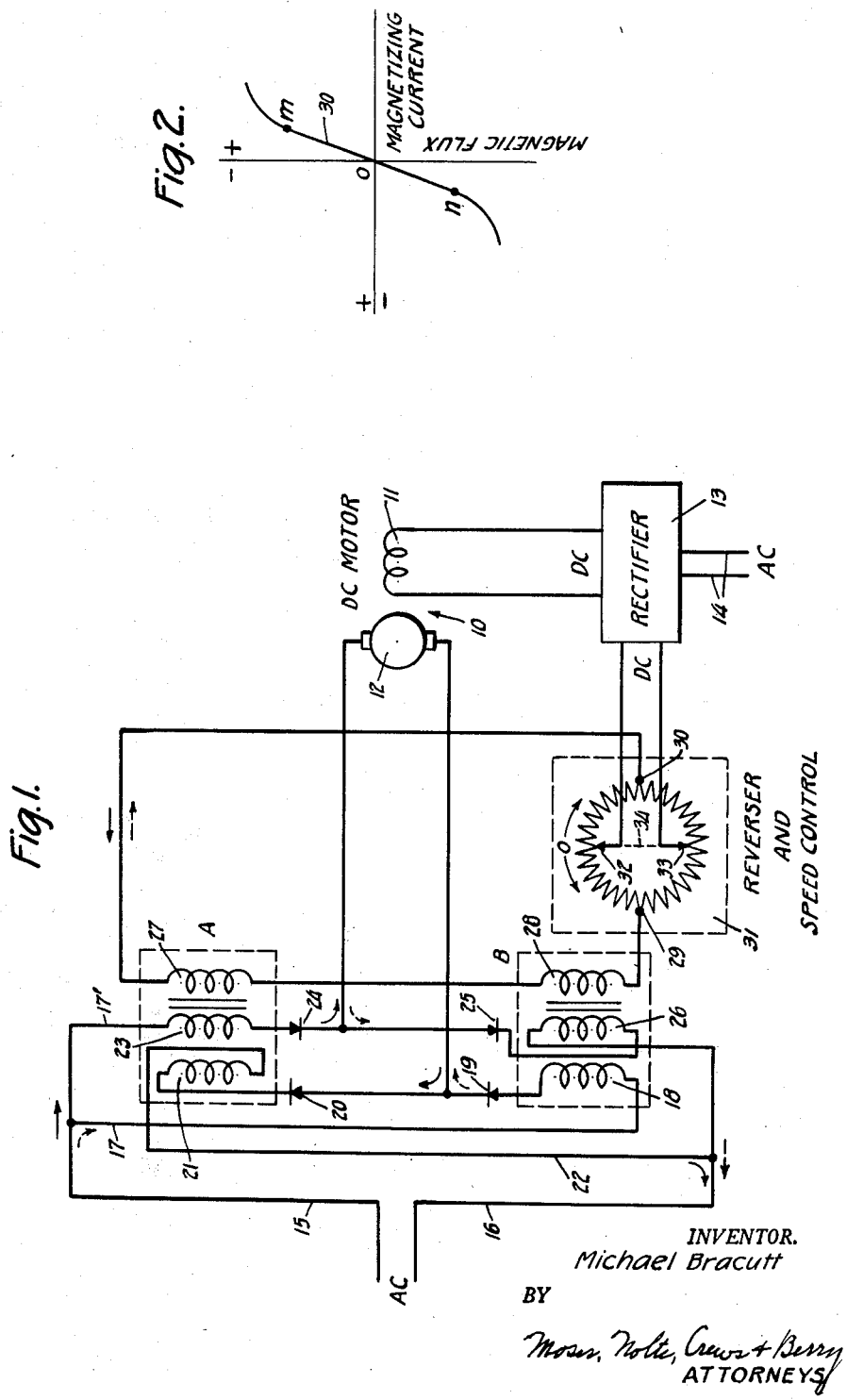
INVENTOR.
Michael Bracutt
BY
Moser, Nolte, Crews + Berry
ATTORNEYS Dec. 16, 1952 M. BRACUTT 2,622,239
DIRECT CURRENT CONTROL SYSTEM
Filed March 18, 1950 4 Sheets-Sheet 4

INVENTOR.
Michael Bracutt
BY
Moser, Nolte, Crews & Berry
ATTORNEYS

Patented Dec. 16, 1952

2,622,239

UNITED STATES PATENT OFFICE 2,622,239

DIRECT CURRENT CONTROL SYSTEM

Michael Bracutt, East Orange, N. J., assignor, by mesne assignments, to Reconstruction Finance Corporation, New York, N. Y., a corporation of the United States Application March 18, 1950, Serial No. 150,420

3 Claims. (Cl. 323—89)

This invention relates to control systems for reversing and/or varying the current supplied to a direct current load. More particularly the invention relates to systems of the saturable reactor type for reversing and/or varying the magnitude of the current supplied to such a load.

The invention finds application in the control of the direction of rotation and of the speed of a direct current motor of the ordinary type and of given power rating from an alternating current source, by means of a relatively small amount of power and without requiring moving parts or vacuum tubes between the control point and the motor.

An object of the invention is to provide control systems of the kind referred to, which are particularly applicable to either single or polyphase power sources and which present a balanced load to such sources.

Another object is to provide a control circuit utilizing saturable reactors or magnetic amplifiers of the self-saturating type for controlling the direction and magnitude of the current supplied to a direct current load energized from an A. C. circuit.

These and other objects and features of the invention will be understood more clearly from the following detailed description in connection with the accompanying drawings, in which:

Fig. 1 is a schematic diagram of an embodiment of the invention illustrating its application as a D. C. motor reverser and speed control circuit energized from a single phase A. C. power source;

Fig. 2 is a characteristic curve of a saturable reactor employed in the circuit of Fig. 1;

Figure 3:
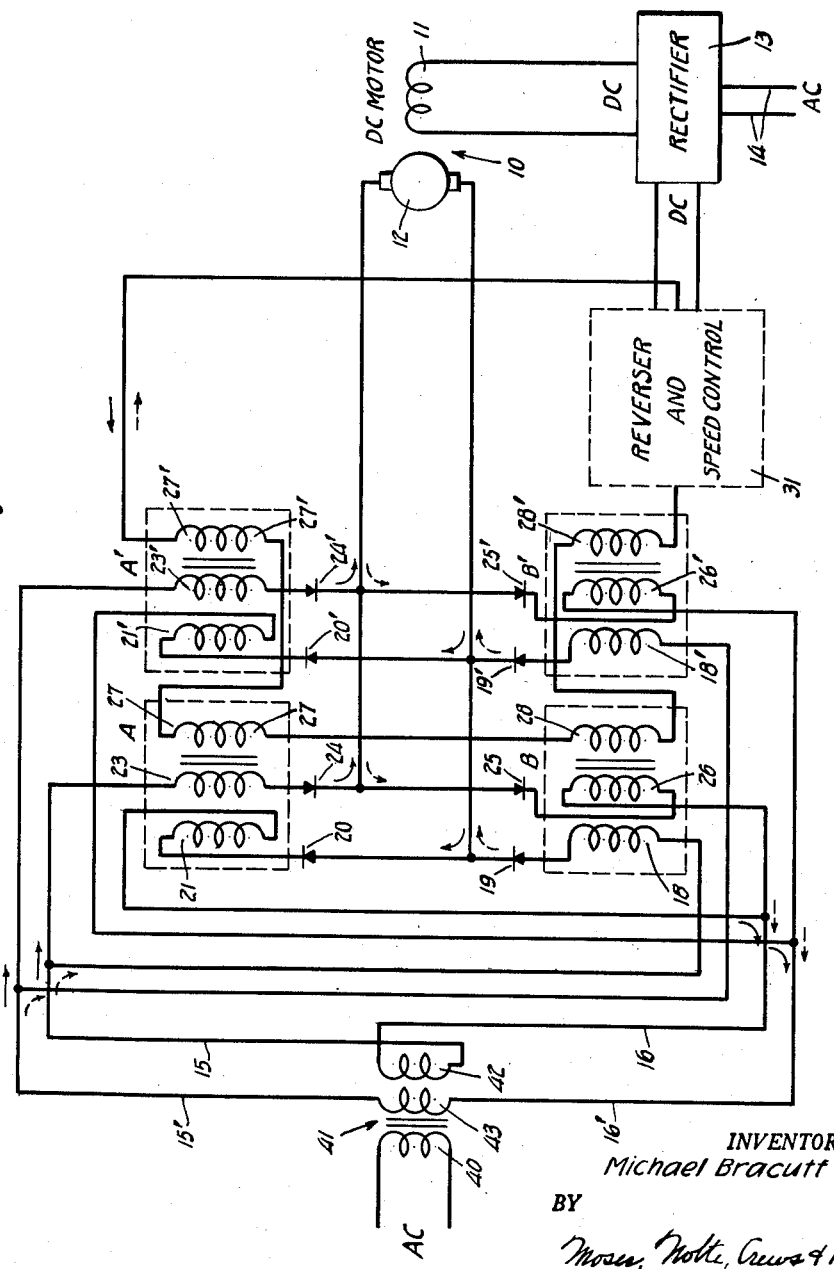
Fig. 3 is a diagram of a system similar to Fig. 1, but adapted to present a balanced load to the A. C. power source.

In Fig. 1, the D. C. motor 10, having the magnetic field 11 and armature 12, has its field 11 connected to the rectifier 13, the rectifier being energized by alternating current applied to the conductors 14 for exciting the field 11. The armature 12 is energized through a load supply circuit by rectified pulses derived from A. C. power applied to conductors 15 and 16, connected through the saturable reactors or magnetic amplifiers A and B. Connected to the conductor 15 is the conductor 17 in series with the coil 18, rectifiers 19 and 20, coil 21, conductor 22 and conductor 16. Also connected to the conductor 15, in parallel with conductor 17 is the conductor 17' in series with the coil 23, rectifiers 24 and 25, coil 26 and conductor 16.

Coils 21 and 23 are saturable reactor load coils of the reactor or magnetic amplifier A, having the D. C. input control coil 27 for controlling the degree of magnetic saturation in the amplifier. Coils 18 and 26 are saturable reactor load coils of the reactor or magnetic amplifier B, having the D. C. input control coil 28 for controlling the degree of magnetic saturation in the amplifier. Amplifiers A and B are of the well known self-saturating or self-excited type.

It will be seen that the paths traced over conductor 17 includes two arms in series, one arm including coil 18 and rectifier 19, and the other arm including rectifier 20 and coil 21, the junction between these arms being connected to the lower terminal of armature 12. Similarly, the path over conductor 17' includes two arms in series, one arm including coil 23 and rectifier 24, and the other arm including rectifier 25 and coil 26, the junction between these arms being connected to the upper terminal of armature 12. It will also be seen that all four of the rectifiers 14, 20, 24 and 25 in the paths 17 and 17' are similarly directed with respect to the parallel connection of these paths with conductors 15 and 16.

The D. C. control coils 27 and 28 are connected in series between the output terminals 29 and 30 of the double potentiometer control 31 which serves as a reverser or speed control unit, providing for manual control of the motor 10. Control unit 31 has the diametrically opposite sliding contacts 32 and 33 rigidly coupled together mechanically, as indicated by the dotted line 34, but insulated electrically from each other, and connected to any suitable source of direct current, such as rectifier 13.

When the control 31 is positioned, as shown, with the sliders 32 and 33 on the zero position, the terminals 29 and 30 are at the same potential, so that no current flows through the control coils 27 and 28 of amplifiers A and B. Under this condition the flux in both amplifiers A and B varies from 0 in Fig. 2 toward the point *m* on curve 30, and the resulting high impedance of reactor coils 18, 21, 23, 26, opposes the flow of current through paths 17 and 17', and no current passes through the rectifiers 19, 20, 24 and 25 to the motor armature 12. Consequently the armature 12 remains without energization.

When sliders 32, 33 of controller 31 are rotated in one direction from the zero position, current begins to flow through D. C. coils 27 and 28, and as the rotation of the sliders is increased, the magnetization of reactors A and B passes through the points $m$ and $n$, respectively, where current begins to flow in appreciable quantity through reactor coils 21 and 23 in series with the armature 12. Any further rotation of controller 31 in the same direction, increases the armature current until the desired speed of rotation of the armature is obtained in one direction. The direction of current flow in the circuit of D. C. control coils 27 and 28 under these conditions and the direction of the corresponding rectified pulses through reactor coils 21 and 23 and rectifiers 29 and 24, is indicated by the full line arrows. It is thus possible to vary the direction and amount of current passing through D. C. control coils 27 and 28 and thereby adjust the degree of magnetization or saturation of reactors A and B.

Reactors A and B are so connected that they are magnetized in opposite directions respectively by current through coils 27 and 28, in the absence of other magnetization applied thereto.

Fig. 2 shows the characteristic curve of magnetizing current through coils 27 and 28, plotted against the magnetic flux produced thereby in reactors A and B. When reactor A is magnetized to the value $m$, where increasing magnetization produces increasing saturation of the reactor A, the reactor B is oppositely magnetized to the value $n$ at the other end of the curve 30 where increasing magnetization produces increasing saturation of the reactor B.

It will be noted that the direction of flow of rectified current through coils 21 and 23 is in the same direction as that produced by the D. C. control current through coil 27, thus increasing the saturation of reactor A, and reducing the energy required in coil 27 to pass the desired current through coils 21 and 23 to the motor 12.

At the same time, the magnetization of reactor B is initially at the value $n$ when appreciable current begins to flow through rectifiers 29 and 24. Any flow of current through coils 19 and 26 will be in a direction tending to decrease the D. C. magnetization of reactor B, and will thus maintain the reactor at high impedance to oppose the flow of current through rectifiers 19 and 25 while reactor A is transmitting current to armature 12.

In a similar manner, when controller 31 is rotated in the opposite direction to that just described, until reactor A is magnetized to a value corresponding with the point $n$, Fig. 2, and reactor B is magnetized to a value corresponding to the point $m$, reactor B is reduced in impedance as controller 31 is adjusted to increase current through coils 27 and 28, while reactor A is maintained at high impedance to prevent appreciable current from passing through rectifiers 20 and 24 to the armature 12. Reactor B thus permits the rectifiers 19 and 25 to transmit rectified pulses to the armature 12 in the direction indicated by the dotted arrows, thus causing the armature 12 to rotate in an opposite direction from that previously described when reactor A was of low impedance. The speed of the armature in each case is controlled by the extent of rotation of controller 31 from its zero position.

It will be understood that the control unit 31 may be replaced by various other well known units, such as a push-pull electronic amplifier unit (not shown), adapted to provide an adjustable and reversible direct current of small value for control purposes.

Fig. 3 shows a full wave arrangement for supplying rectified pulses to the armature 12 during each half cycle of the wave from a single phase source connected to the primary coil 40 of the transformer 41 having the secondary coils 42 and 43. It will be seen that Fig. 3 is made up of a pair of systems similar to that shown in Fig. 1, with the exception that a single D. C. motor is connected in place of the separate D. C. motors that would be provided in two complete systems like that of Fig. 1. A further exception is that the D. C. control coils 27 and 28 of one system are connected in series with the control coils 27' and 28' of the other system, these coils being in series with a single control unit 31 which takes the place of two separate control units which would be necessary if the systems were entirely separate.

One system in Fig. 3, corresponding with the system of Fig. 1, includes the conductors 15 and 16 connected with secondary coil 42 serving as a source of A. C. and magnetic amplifiers A and B with the accompanying rectifiers 20, 24 and 19, 25, as shown in Fig. 1. The other system is similar to that just described, as shown by the same reference characters with a prime added thereto.

It will be noted that secondary coil 43 serves as the A. C. source connected to conductors 15' and 16' and that coil 43 is connected 180 degrees out of phase with respect to the connection of coil 42 with conductors 15 and 16. Coil 43 is thus poled in a direction to transmit rectified pulses to the armature 12 during the parts of the cycle when coil 42 is not transmitting pulses to the armature. Under these circumstances it will be seen that a rectified pulse of current is supplied to the armature 12 during each half cycle of the A. C. wave as compared with Fig. 1 in which a rectified pulse is transmitted to the armature during only one-half of each cycle. The Fig. 3 arrangement consequently presents a balanced load to the A. C. source connected with the primary coil 40, and also supplies a larger amount of power to the motor armature 12. The detailed operation of the Fig. 3 combination corresponds in its parts with that described for Fig. 1.

Figure 4:
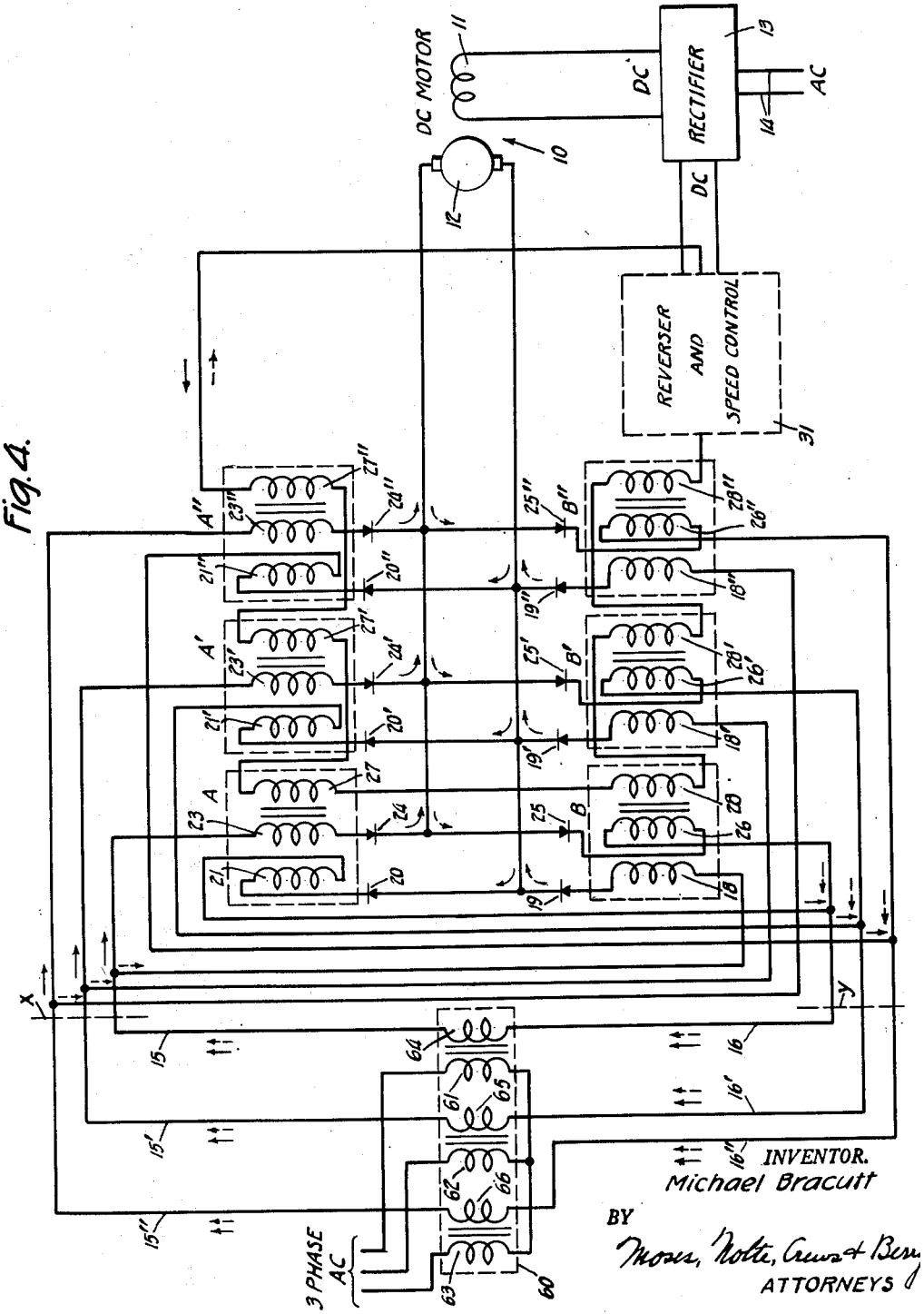
Fig. 4 is a diagram of a system energized by a polyphase power source.

Fig. 4 shows a three phase transformer 60 having the primary coils 61, 62 and 63 connected in Y-arrangement and the separate secondary coils 64, 65 and 66 coupled respectively with primary coils 61, 62 and 63. Fig. 4 includes three systems similar to that of Fig. 1. The three systems are combined in a manner similar to that explained in connection with the combination of the two systems in Fig. 3, the motor 12 taking the place of three separate motors that would be provided if the systems were separate from each other, and the control 31 taking the place of three separate controls. It will be noted that the D. C. control coils 27, 27', 27'', 28'', 28', and 28 are all in series with control 50.

Conductors 15 and 16 of a first system, corresponding with Fig. 1, are connected to the terminals of secondary coil 64. Conductors 15' and 16' of a second system are connected to the terminals of the secondary coil 65, and conductors 15'' and 16'' of a third system are connected to the terminals of secondary coil 66. The secondary coils 64, 65 and 66 are so poled with respect to conductors 15, 16, and 15', 16' and 15'', 16'' respectively that they transmit rectified pulses to the armature 12 in the same sequence as the phase sequence of the three phase source connected to the primary coils 61, 62 and 63. As a result of the described three phase arrangement, a balanced load is presented to the three phase source of power and a considerably larger amount of power is supplied to the armature 12 than in the case of single phase half wave system, such as shown in Fig. 1. The detailed operation of the parts of Fig. 4 corresponds with that described for Fig. 1.

Figure 5:
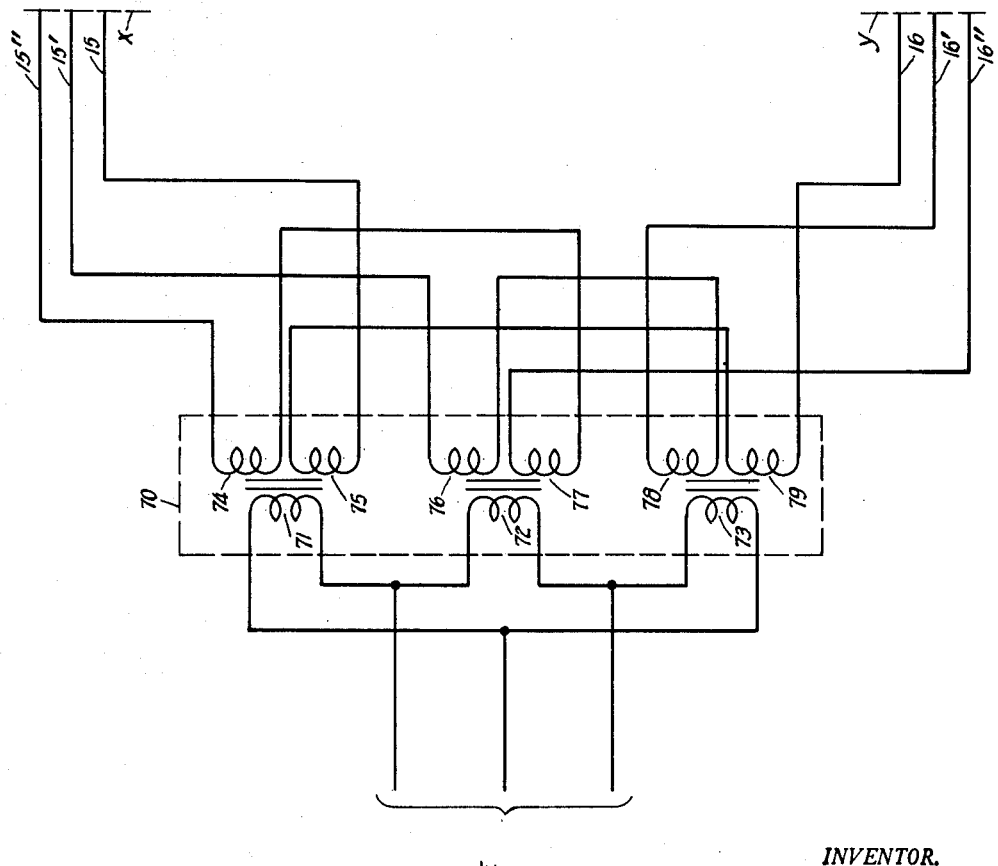
Fig. 5 shows a modification of the polyphase connections of Fig. 4.

Fig. 5 shows a modification of the three phase transformer connections for conductors 15, 16, 15', 16' and 15'', 16'' of Fig. 4, which may be substituted in Fig. 4. In Fig. 5, the three phase transformer 70 has the primary coils 71, 72 and 73, connected in delta arrangement to the source of A. C. Primary coil 71 has secondary coils 74 and 75 coupled therewith, primary coils 72 has secondary coils 76 and 77 coupled therewith, and primary coil 73 has secondary coils 78 and 79 coupled therewith.

Secondary coils 74 and 77 are connected in series with each other to conductors 15 and 16, coils 76 and 78 are connected in series with each other to conductors 15' and 16', and coils 75 and 79 are connected in series with each other to conductors 15'' and 16''. The coils in each pair of series connections, just described, are so poled as to add their voltages in a similar sequence and to transmit rectified pulses to the armature 12 in the same sequence as the phase sequence of the three phase power source. The connections in Fig. 5 serve to distribute the load more uniformly between the different phases of the power source.

The embodiments of the invention described above are illustrative of its application for the control of the speed and direction of rotation of a direct current motor. Obviously, the invention may be used in any other application where it is desired to control the magnitude and direction of a unidirectional current supplied to a load in accordance with the magnitude and direction of a much weaker control current.

I have described what I believe to be the best embodiments of my invention. I do not wish, however, to be confined to the embodiments shown. What I desire to cover by Letters Patent is set forth in the appended claims.

I claim:

1. In a control system responsive to a unidirectional control current whose direction and magnitude is determinative of the direction and magnitude of a larger unidirectional current to be supplied to a load; a pair of saturable reactors, each reactor having a control winding and a pair of load windings, the reactances of the load windings being reduced by the flow of unidirectional current in the control winding; circuit means for applying the control current to the control windings with opposite polarity in each reactor; a separate half-wave rectifier individually connected in series with each load winding, the polarity of every rectifier being such as to permit current to flow through its associated load winding in the same direction in all of the load windings; a first energizing circuit adapted for connection to an alternating current source and serially including one of the load windings of each reactor together with their two associated rectifiers; a second energizing circuit connected in parallel with the first energizing circuit serially including the other load winding of each reactor together with their two associated rectifiers; and a load supply circuit extending from a point in each energizing circuit intermediate the two serially connected load windings and also intermediate the two rectifiers thereof and adapted to be connected to the load for the controlled energization thereof.

2. A pair of control systems according to claim 1 wherein the control current is applied to each system by common circuit means, and in which the load supply circuit is common to the two systems, the rectifiers in each system being so poled with respect to the alternating current source that the load will be energized during one series of alternate half-cycles of the alternating current by one of the systems, and during the other series of alternate half-cycles by the other system to provide full-wave energization of the load.

3. A plurality of control systems according to claim 1 for common energization from a polyphase alternating current source, consisting of one such system for each phase, the control current being applied to each of the several systems by common circuit means, and in which the load supply circuit is common to the several systems, the rectifiers in each system being so poled with respect to each phase of the alternating current source that the load will be consecutively energized by each of the several phases.

MICHAEL BRACUTT.

REFERENCES CITED

The following references are of record in the file of this patent:

UNITED STATES PATENTS

| Number | Name | Date |
|---|---|---|
| 2,100,715 | Jenks | Nov. 30, 1937 |
| 2,310,955 | Hornfeck | Feb. 16, 1943 |
| 2,414,936 | Edwards et al. | Jan. 28, 1947 |
| 2,453,624 | Glass | Nov. 9, 1948 |
| 2,509,864 | Hedstrom | May 30, 1950 |